US010359523B2

(12) United States Patent
Casey

(10) Patent No.: US 10,359,523 B2
(45) Date of Patent: Jul. 23, 2019

(54) EXPLORATION AND EXTRACTION METHOD AND SYSTEM FOR HYDROCARBONS

(71) Applicant: Matthew S. Casey, Houston, TX (US)

(72) Inventor: Matthew S. Casey, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1015 days.

(21) Appl. No.: 14/749,756

(22) Filed: Jun. 25, 2015

(65) Prior Publication Data
US 2016/0041279 A1    Feb. 11, 2016

Related U.S. Application Data

(60) Provisional application No. 62/033,529, filed on Aug. 5, 2014.

(51) Int. Cl.
| | | |
|---|---|---|
| *G06F 17/10* | (2006.01) | |
| *G01V 1/00* | (2006.01) | |
| *G01V 99/00* | (2009.01) | |
| *G06T 17/05* | (2011.01) | |

(52) U.S. Cl.
CPC .............. *G01V 1/00* (2013.01); *G01V 99/005* (2013.01); *G06T 17/05* (2013.01); *G01V 2210/66* (2013.01)

(58) Field of Classification Search
CPC ......... G06T 17/05; G01V 1/00; G01V 99/005
USPC .................................................. 703/2, 9, 10
See application file for complete search history.

(56) References Cited

U.S. PATENT DOCUMENTS

| | | | |
|---|---|---|---|
| 5,706,194 A | 1/1998 | Neff et al. | |
| 5,844,799 A | 12/1998 | Joseph et al. | |
| 5,953,680 A | 9/1999 | Divies et al. | |
| 6,014,343 A | 1/2000 | Graf et al. | |
| 6,018,498 A | 1/2000 | Neff et al. | |
| 6,044,328 A | 3/2000 | Murphy et al. | |
| 6,106,561 A | 8/2000 | Farmer | |

(Continued)

FOREIGN PATENT DOCUMENTS

| | | |
|---|---|---|
| EP | 0742923 | 4/2000 |
| EP | 0745870 | 11/2002 |

(Continued)

OTHER PUBLICATIONS

Galli, A. et al., "Stochastic models for reservoir characertization: a user-friendly review," SPE 38999, $5^{th}$ Latin American and Caribbean Petroleum Eng. Conf. & Exh., Rio de Janeiro, Brazil, 12 pgs., Aug. 30-Sep. 3, 1997.

(Continued)

*Primary Examiner* — Andre Pierre Louis
(74) *Attorney, Agent, or Firm* — ExxonMobil Upstream Research Company—Law Department

(57) ABSTRACT

A method for hydrocarbon exploration and extraction is described. Specifically, the method includes using synthesis in reservoir modeling. The method may include obtaining local coordinates associated with a subsurface region. Then, a synthesis is performed with the local coordinates to determine continuous parameters and/or categorical parameters based on the synthesis. Then, a fluid flow simulation is performed from the continuous parameters and/or categorical parameters.

29 Claims, 10 Drawing Sheets
(6 of 10 Drawing Sheet(s) Filed in Color)

(56) References Cited

U.S. PATENT DOCUMENTS

| | | |
|---|---|---|
| 6,128,577 A | 10/2000 | Assa |
| 6,138,076 A | 10/2000 | Graf et al. |
| 6,370,491 B1 | 4/2002 | Malthe-Sorenssen et al. |
| 6,374,185 B1 | 4/2002 | Taner et al. |
| 6,549,854 B1 | 4/2003 | Malinverno et al. |
| 6,597,995 B1 | 7/2003 | Cornu et al. |
| 6,803,997 B2 | 10/2004 | Stanek |
| 6,980,940 B1 | 12/2005 | Gurpinar et al. |
| 7,031,891 B2 | 4/2006 | Malthe-Sorenssen et al. |
| 7,043,367 B2 | 5/2006 | Granjeon |
| 7,043,410 B2 | 5/2006 | Malthe-Sorenssen et al. |
| 7,069,149 B2 | 6/2006 | Goff et al. |
| 7,089,166 B2 | 8/2006 | Malthe-Sorenssen et al. |
| 7,254,091 B1 | 8/2007 | Gunning et al. |
| 7,363,163 B2 | 4/2008 | Valec-Dupin et al. |
| 7,424,415 B2 | 9/2008 | Vassilev |
| 7,433,786 B2 | 10/2008 | Adams |
| 7,451,066 B2 | 11/2008 | Edwards et al. |
| 7,478,024 B2 | 1/2009 | Gurpinar et al. |
| 7,480,205 B2 | 1/2009 | Wei |
| 7,523,024 B2 | 4/2009 | Endres et al. |
| 7,542,037 B2 | 6/2009 | Fremming |
| 7,596,056 B2 | 9/2009 | Keskes et al. |
| 7,596,481 B2 | 9/2009 | Zamora et al. |
| 7,706,981 B2 | 4/2010 | Wilkinson et al. |
| 7,711,532 B2 | 5/2010 | Dulac et al. |
| 7,739,089 B2 | 6/2010 | Gurpinar et al. |
| 7,756,694 B2 | 7/2010 | Graf et al. |
| 7,796,469 B2 | 9/2010 | Keskes et al. |
| 7,925,481 B2 | 4/2011 | Van Wagoner et al. |
| 7,933,750 B2 | 4/2011 | Morton et al. |
| 7,953,585 B2 | 5/2011 | Gurpinar et al. |
| 7,973,798 B2 | 7/2011 | Wei et al. |
| 7,986,319 B2 | 7/2011 | Dommisse |
| 8,234,073 B2 | 7/2012 | Pyrcz et al. |
| 8,255,195 B2 | 8/2012 | Yogeswaren |
| 8,315,845 B2 | 11/2012 | Lepage |
| 8,355,898 B2 | 1/2013 | Pyrcz et al. |
| 8,374,836 B2 | 2/2013 | Yogeswaren |
| 8,380,435 B2 | 2/2013 | Kumaran et al. |
| 8,447,522 B2 | 5/2013 | Brooks |
| 8,447,525 B2 | 5/2013 | Pepper et al. |
| 8,452,580 B2 | 5/2013 | Strebelle |
| 8,457,940 B2 | 6/2013 | Xi et al. |
| 8,463,586 B2 | 6/2013 | Mezghani et al. |
| 8,515,678 B2 | 8/2013 | Pepper et al. |
| 8,515,720 B2 | 8/2013 | Koutsabeloulis et al. |
| 8,577,660 B2 | 11/2013 | Wendt et al. |
| 8,594,986 B2 | 11/2013 | Lunati |
| 8,599,643 B2 | 12/2013 | Pepper et al. |
| 8,606,555 B2 | 12/2013 | Pyrcz et al. |
| 8,639,444 B2 | 1/2014 | Pepper et al. |
| 8,655,632 B2 | 2/2014 | Moguchaya |
| 8,674,984 B2 | 3/2014 | Ran et al. |
| 8,694,261 B1 | 4/2014 | Robinson |
| 8,731,887 B2 | 5/2014 | Hilliard et al. |
| 8,775,142 B2 | 7/2014 | Liu |
| 8,798,974 B1 | 8/2014 | Nunns |
| 8,818,778 B2 | 8/2014 | Salazar-Tio et al. |
| 8,843,353 B2 | 9/2014 | Posamentier et al. |
| 8,922,558 B2 | 12/2014 | Page et al. |
| 8,935,141 B2 | 1/2015 | Ran et al. |
| 9,014,982 B2 | 4/2015 | Da Costa Paiva et al. |
| 2006/0122780 A1 | 6/2006 | Cohen et al. |
| 2006/0269139 A1 | 11/2006 | Keskes et al. |
| 2009/0046095 A1 | 2/2009 | Couvillion et al. |
| 2009/0262603 A1 | 10/2009 | Hurley et al. |
| 2010/0299111 A1* | 11/2010 | Dale ............... E21B 47/00 703/2 |
| 2011/0012910 A1* | 1/2011 | Wei ............... G06T 11/001 345/582 |
| 2011/0044540 A1 | 2/2011 | Kovacic et al. |
| 2011/0115787 A1 | 5/2011 | Kadlec |
| 2011/0213600 A1 | 9/2011 | Strebelle |
| 2011/0310101 A1 | 12/2011 | Prange et al. |
| 2012/0265510 A1* | 10/2012 | Lepage ............ G01V 99/005 703/9 |
| 2013/0030782 A1 | 1/2013 | Yogeswaren |
| 2013/0046524 A1 | 2/2013 | Gathogo et al. |
| 2013/0073268 A1 | 3/2013 | Abacioglu et al. |
| 2013/0110484 A1 | 5/2013 | Hu et al. |
| 2013/0124161 A1 | 5/2013 | Poudret et al. |
| 2013/0136158 A1 | 5/2013 | Hegazy et al. |
| 2013/0138412 A1 | 5/2013 | Shi et al. |
| 2013/0179080 A1 | 7/2013 | Skalinski et al. |
| 2013/0218539 A1 | 8/2013 | Souche |
| 2011/0332125 | 12/2013 | Suter et al. |
| 2013/0332125 A1 | 12/2013 | Suter et al. |
| 2014/0136158 A1 | 5/2014 | Hegazy et al. |
| 2014/0136171 A1 | 5/2014 | Sword, Jr. et al. |
| 2014/0278928 A1 | 9/2014 | Smith |
| 2015/0120199 A1 | 4/2015 | Casey |
| 2015/0355353 A1 | 12/2015 | Whitaker et al. |

FOREIGN PATENT DOCUMENTS

| | | |
|---|---|---|
| EP | 1865343 | 12/2007 |
| WO | WO 2011/106135 | 9/2011 |
| WO | WO 2014/185898 | 11/2014 |

OTHER PUBLICATIONS

Holdorsen, H.H. et al., "Stochastic Modeling," SPE 21255 and 21299, *J. of Petroleum Technology* 42(4), pp. 404-412, 1990.

Strebelle, S., "Conditional Simulation of Complex Geological Structures Using Multiple-Point Statistics," *Mathematical Geology* 34(1), pp. 1-21, Jan. 2002.

Tong, X. et al., "Synthesis of Bidirectional Texture Functions on Arbitrary Surfaces," *Siggraph*, pp. 665-672, 2002.

Yarus, J.M. et al., "Practical Geostatistics—An Armchair Overview for Petroleum Reservoir Engineers," SPE 103357, *J. of Petroleum Technology* 58(11), pp. 78-86, Nov. 2006.

\* cited by examiner

EXPLORATION AND EXTRACTION METHOD AND SYSTEM FOR HYDROCARBONS

CROSS-REFERENCE TO RELATED APPLICATION

This application claims the benefit of U.S. Provisional Patent Application 62/033,529, filed Aug. 5, 2014, entitled EXPLORATION AND EXTRACTION METHOD AND SYSTEM FOR HYDROCARBONS, the entirety of which is incorporated by reference herein.

FIELD OF THE INVENTION

This invention relates generally to the field of hydrocarbon exploration and extraction. Specifically, the invention is a method for modeling a reservoir using synthesis in reservoir modeling.

BACKGROUND

This section is intended to introduce various aspects of the art, which may be associated with exemplary embodiments of the present disclosure. This discussion is believed to assist in providing a framework to facilitate a better understanding of particular aspects of the disclosed methodologies and techniques. Accordingly, it should be understood that this section should be read in this light, and not necessarily as admissions of prior art.

Hydrocarbon prospecting typically involves obtaining measurements of the subsurface and forming a subsurface model from the measurements. The subsurface model, which may be referred to as a static reservoir model, provides the various structures present in the subsurface formation. Then, the static reservoir model is used to create a dynamic reservoir model by upscaling the static reservoir model into another model scale. As part of this process, the creation of the static reservoir model may include building a structural framework using faults and stratigraphic horizons, constructing a cellular grid based on the structural framework, and filling the cellular grid with subsurface parameters for use in fluid flow simulation.

Within the field of reservoir modeling, geostatistical simulation is the conventional method for populating the cellular grid with subsurface parameters. As an example, Haldorsen describes various stochastic modeling methods as applies to reservoir modeling. See, e.g., Haldorsen, H. Damsleth, E., 1990, "Stochastic Modeling", Society of Petroleum Engineers, Journal of Petroleum Technology, Volume 42, Number 4, p. 404-412, SPE 21255 and 21299. The reference describes that geostatistical simulation provides a more realistic representation of geology than spatial interpolation. The reference further describes that these stochastic models are then used for fluid flow simulations for reservoir performance prediction estimates.

Furthering this technique, geostatistical methods have extended the point-to-point simulation to multiple-point simulation techniques. As an example, the Strebelle reference describes borrowing the required multiple-point statistics from training images depicting the expected patterns of geological heterogeneities. See, e.g., Strebelle, S., 2002, "Conditional Simulation of Complex Geologic Structures Using Multiple Point Statistics", Mathematical Geology, January 2002, Volume 34, Issue 1, pp 1-21, 2002). The reference further describes that the methods are tested on the simulation of a fluvial hydrocarbon reservoir with meandering channels.

As another example, the Galli reference describes the use of multiple Gaussian random fields called plurigaussian simulation. See, e.g., Galli, A., Beucher, H., 1997, "Stochastic models for reservoir characterization: a user-friendly review", Latin American and Caribbean Petroleum Engineering Conference, 30 Aug.-3 Sep. 1997, Rio de Janeiro, Brazil, SPE 38999. This reference describes various types of stochastic models that are conventionally utilized. While plurigaussian simulation is used to preserve spatial continuity and juxtaposition of discrete indicators, it is difficult to parameterize and still relies on sequential simulation within a predefined cellular grid.

As yet another example, the Yarus reference describes sampling uncertainty by producing several possible 3D geological realizations instead of one best and probably flawed—deterministic model. See, e.g., Yarus, J., Chambers, R. L., 2006, "Practical Geostatistics—An Armchair Overview for Petroleum Reservoir Engineers", Journal of Petroleum Technology, Volume 58, Number 11, p. 78-86, SPE 103357. The reference describes that geostatistical simulation is a sequential method, which the cells of a grid are simulated in a random order. See id. Therefore each random path through the cellular grid yields an equally valid but different result. Many realizations of these stochastic models are necessary to capture the uncertainty in the stochastic parameterization. This sequential simulation paradigm leaves little room for optimization of the algorithms, necessitates many realizations and consequently takes a long time.

The methods described in these different references, each use a nested parameter population strategy. That is, the methods start by populating the cellular grid with an indicator or a discrete property, such as facies or rock type. Then, a continuous petrophysical property, such as porosity or grain size is populated with potentially different algorithmic parameters within each indicator or discrete domain. The nesting of the population is a workflow technique to handle the change in statistical distribution of the continuous properties based on a blocking indicator variable like facies or rock type. The basis for this approach is that the discrete properties may be more spatially predictive over a larger scale that the continuous property. As a result, a modeler can populate the semblance of non-stationarity of the final petrophysical property. Also, the modeler may model continuity of the discrete property separately from the continuous property, potentially at different continuity scales.

However, these techniques have certain limitations. For example, as models utilized in fluid flow simulators are larger and the resolution is finer (e.g., smaller cell size), the computational time for the above methods increases and is computationally inefficient. The inefficiency is a result of the sequential nature of the simulation methods along with the number of cells used in the reservoir model. This fact is further compounded by the typical method of applying a nested approach to modeling wherein two methods of geostatistical simulation are applied in sequence. As such, fluid flow simulations that utilize the conventional parallel processing approach are bottlenecked by the parameter population in the reservoir modeling workflow.

As a result, an enhancement to parameter population techniques is needed to efficiently model hydrocarbon reservoirs for fluid flow simulation. Some of the results of the fluid flow simulation may be feedback into the workflow to adjust certain parameters of the parameter population.

SUMMARY OF THE INVENTION

In one embodiment, a method for exploring and extracting hydrocarbons is described, which involves modeling a reservoir. The method includes obtaining local coordinates associated with a subsurface region; performing a synthesis with the local coordinates; determining one or more of continuous parameters and categorical parameters based on the synthesis; and performing a fluid flow simulation from the one or more of continuous parameters and categorical parameters.

Further, a system for modeling a reservoir using synthesis is described. The system include a processor; an input device in communication with the processor and configured to receive input data associated with a subsurface region; and memory in communication with the processor, the memory having a set of instructions. The set of instructions, when executed, are configured to: obtain local coordinates associated with the subsurface region; perform a synthesis with the local coordinates; determine one or more of continuous parameters and categorical parameters based on the synthesis; and perform a fluid flow simulation from the one or more of continuous parameters and categorical parameters.

In certain embodiments, the method and system may include selecting to perform one of a continuous parameter synthesis and a combination of categorical parameter synthesis and a continuous parameter synthesis. Further, the synthesis may include a continuous parameter synthesis by a procedural synthesis (e.g., computing a function of the local coordinates and noise) and/or a continuous parameter synthesis by an example based synthesis. Finally, hydrocarbons may be produced based on the fluid flow simulation.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee. In countries where patent rules prevent the use of color, the color originals are replaced by black-and-white reproductions.

The foregoing and other advantages of the present disclosure may become apparent upon reviewing the following detailed description and drawings of non-limiting examples of embodiments.

DETAILED DESCRIPTION OF THE PREFERRED EMBODIMENTS

Figure 1:
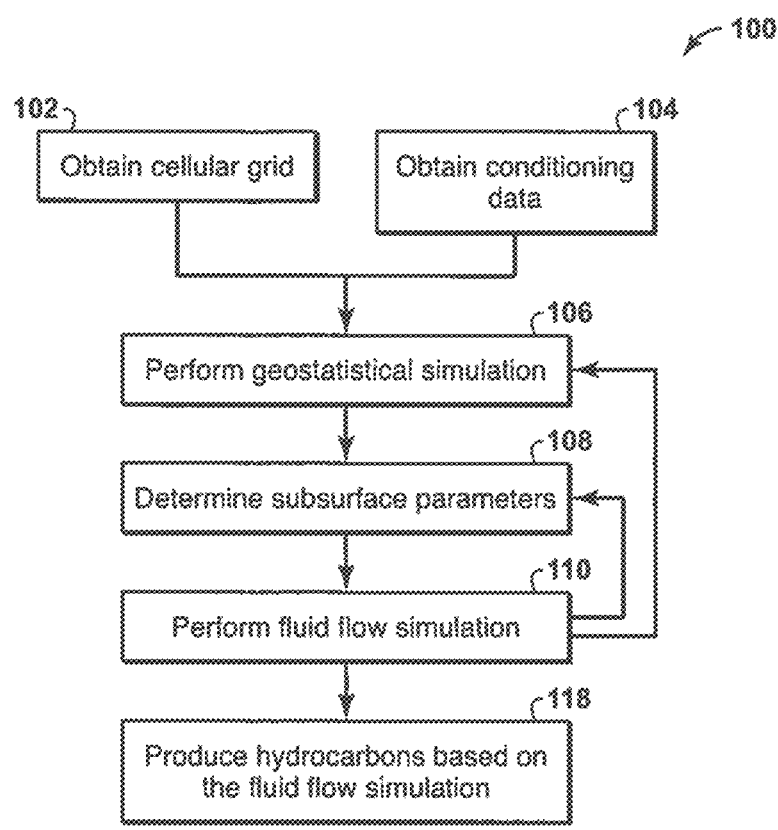
FIG. 1 is a flow chart for performing a stochastic modeling workflow.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

To begin, the sequential geostatistical simulation has conventionally been used for parameter population in reservoir modeling. This aspect has been further progressed beyond bivariate moments of variography to capture multiple-point statistics (MPS). MPS relies on an example image to learn the multi-point patterns that are related to a geologic concept. The simulation remains as a sequential process, wherein cells in a grid are visited in a random order and a subsurface parameter is populated for each cell in turn.

In present techniques, the method utilizes synthesis (e.g., synthesizing textures) as an enhancement to the present techniques. As an example, the method may use example-based synthesis for reservoir property modeling. In synthesis, reservoir property values are not populated directly. Rather, the method populates location values of a reference or example image and then the desired property is indexed from the location values. This shift in approach provides a mechanism to design synthesis methods that operates in parallel as location values are populated simultaneously and independently.

In synthesis, example-based and procedural are two types of synthesis methods that may be utilized. Procedural synthesis operates by evaluating a procedure on input data. Examples of typical procedures include inputting local coordinates in a reservoir model and then using a function on the local coordinates to produce an output. Example-based synthesis uses additional data as an example for reference in the synthesis process. The example data may include multiple input types co-located with the corresponding local coordinates: reservoir property to model; indicators of domains; signed distance functions; vector fields; tensor fields; Jacobian fields; locally computed basis functions; and any other relevant feature of the example data. In the example-based synthesis method, location values of the local coordinates of the example data are created within the reservoir model. The synthesized coordinates are then used to locate the values of the reservoir properties in the example image to populate the reservoir model.

The adherence to a cellular grid along with sequential nature of geostatistical methods results in slow performance in large reservoir models. The present techniques replace these methods with a synthesis method. Synthesis is not dependent on a cellular grid, but relies upon local coordinates (e.g., only the local coordinates, which may include a first local coordinates and a second local coordinates), and can be processed in parallel operations. Various aspects of the present techniques are described further in FIGS. 1 to 13.

FIG. 1 is a flow chart for performing a stochastic modeling workflow. This flow chart 100 involves a geostatistical workflow. In this flow chart 100, a cellular grid and conditioning data are obtained in blocks 102 and 104. Then, a geostatistical simulation is performed in block 106. The results of the geostatistical simulation are then used to determine subsurface parameters in block 108. With the subsurface parameters, the fluid flow simulation is performed in block 110. Following the fluid flow simulation, the results of the fluid flow simulation may be used to perform another geostatistical simulation, as shown in block 106. However, as this may be prohibitively time consuming for larger models, the process may use the fluid flow simulation to adjust the subsurface parameters in block 108.

Regardless, the fluid flow simulation is provided for analysis and review to determine how to produce the hydrocarbons. As shown in block 112, the hydrocarbons are produced based on the fluid flow simulations. With the identification of hydrocarbons, drilling of a well may be performed to provide access to hydrocarbon accumulations. The production may include installing a production facility configured to monitor and produce hydrocarbons from the production intervals that provide access to the hydrocarbons in the subsurface formation. The production facility may include one or more units to process and manage the flow of production fluids, such as hydrocarbons and/or water, from the formation. To access the production intervals, the production facility may be coupled to a tree and various control valves via a control umbilical, production tubing for passing fluids from the tree to the production facility, control tubing for hydraulic or electrical devices, and a control cable for communicating with other devices within the wellbore.

As fluid flow simulations are routinely operated in parallel, the nested geostatistical simulation in block 106 is a bottle neck in the reservoir modeling workflow. In this method, it is preferred to have geostatistical simulation and reservoir simulation (e.g., fluid flow simulation) performed together in an integrated manner. For example, some of the results of the fluid flow simulation in block 110 may be feedback into the geostatistical simulation in block 106 to change certain parameters of the geostatistical simulation. With large models having larger numbers of cells, this feedback is prohibitively slow due to the computational cost of the geostatistical simulations. Accordingly, conventional methods modify the subsurface parameters in block 108 directly from the fluid flow simulation in block 110 to save on the time needed to perform the geostatistical simulations.

As a result, the changes in the reservoir model are very isolated and localized, instead of smoother more gradual changes made by changing the parameters of the geostatistical simulation.

As noted above in Haldorsen, Galli, and Yarus references, sequential simulation has been the mechanism to perform the geostatistical simulations. While the technology has provided extends bivariate moments of variography to capture multiple-point statistics (MPS), MPS relies on an example image to learn the multi-point patterns that are related to a geologic concept. Even with these extensions, the geostatistical simulation remains as a sequential process, which is time consuming.

To enhance the stochastic modeling workflow, the present techniques replace geostatistical simulation with synthesis. Synthesis may use a continuous parameter synthesis or a combination of categorical and continuous parameter synthesis, which is shown further in FIG. 2. Procedural and example-based synthesizes are both methods for continuous and/or categorical parameter synthesis. The present techniques use local coordinate systems in both procedural and example-based synthesis. For example, as noted above, the Haldorsen, Galli, and Yarus references rely on a cellular grid. The adherence to a cellular grid along with sequential nature of geostatistical simulations are the reasons for slow performance in large reservoir models. By removing this reliance with the synthesis method, the dependence on a cellular grid is removed and the data may be processed in parallel operations.

Figure 2:
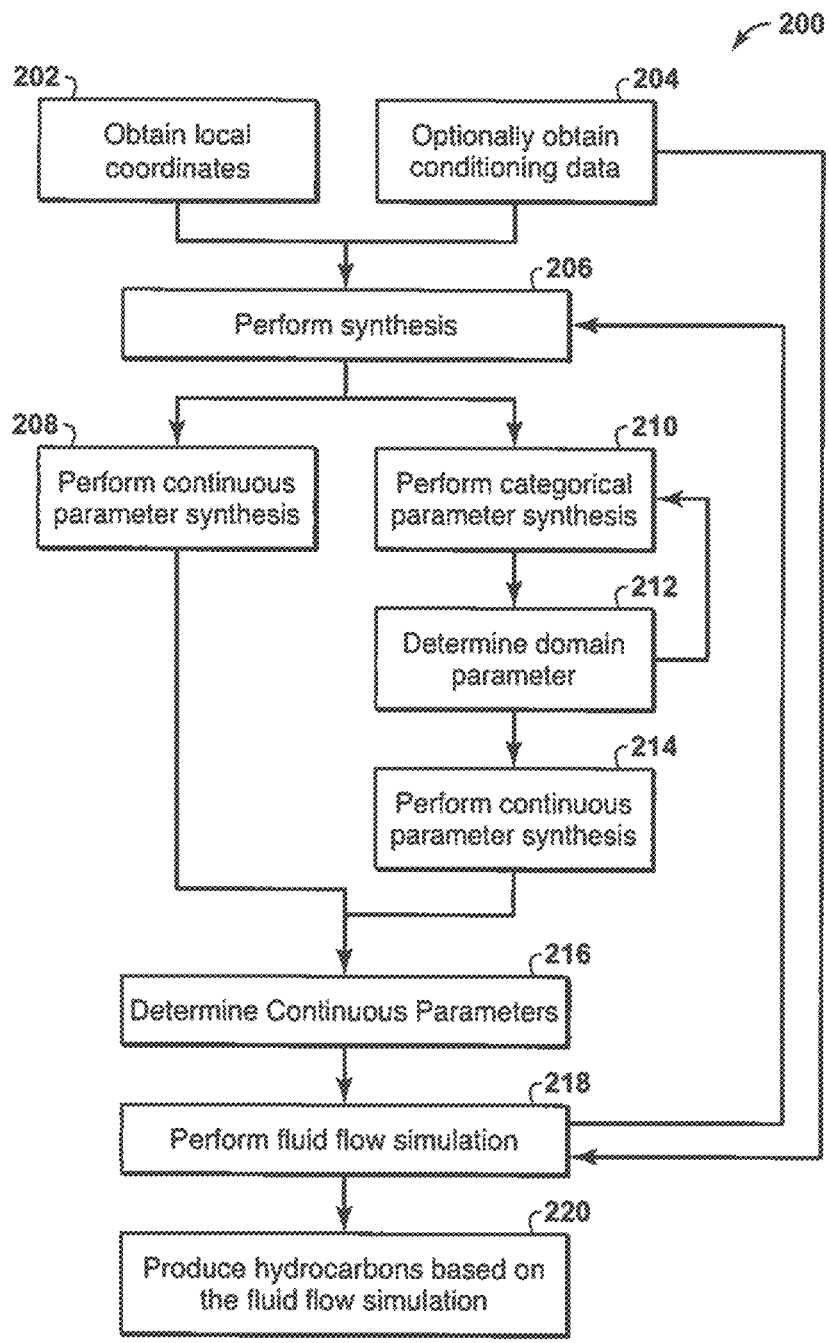
FIG. 2 is a flow chart for performing a workflow of synthesis in reservoir modeling in accordance with an exemplary embodiment of the present techniques.

FIG. 2 is a flow chart for performing a workflow of synthesis in reservoir modeling in accordance with an exemplary embodiment of the present techniques. In this flow chart 200, similar reference characters presented in FIG. 1 and utilized in this figure for simplicity. The flow chart 200 replaces geostatistical simulation with synthesis.

In this flow chart 200, local coordinates are obtained, as shown in block 202. The local coordinates may include I and J coordinates or may be referred to as first and second coordinates. As may be appreciated, the coordinates may be 3D images as well. Also, conditioning data may optionally be obtained in block 204. The conditioning data may be from a wellbore data, seismic data and/or other suitable measurement data of the subsurface region.

Then, a synthesis is performed in block 206. The synthesis involves the use of a local coordinate system. The performance of the synthesis may include a continuous parameter synthesis, as shown in block 208, or a combination of categorical and continuous parameter synthesis, as shown in blocks 210, 212 and 214. For the continuous parameter synthesis, the continuous parameter synthesis can be either a procedural synthesis or an example based synthesis is performed in block 208. The continuous parameter synthesis involves selecting either a procedural or example based method and applying it to the input data. The results of the continuous parameter synthesis are provided to block 216, which is discussed further below.

For the combination of categorical and continuous parameter synthesis, the categorical parameter synthesis is performed at block 210. Again, as with continuous synthesis, there is a choice between procedural or example based synthesis. Then, at block 212, the domain parameters are determined. The determination of the domain parameters may include selecting a set or subset of the categories resultant from the categorical synthesis. That is, the domain parameters are values or logic indicators. The domain parameters may be provided to block 210 to perform another categorical synthesis, if further refinement is needed for the subsurface description or to honor the input data. The further refinement may be based on the input data (e.g., rock types for synthesizing porosity). At block 214, a continuous parameter synthesis is performed. Similar to the discussion of block 208, the continuous parameter synthesis involves selecting either a procedural or example based method and applying it to the input data. The results of the continuous parameter synthesis are provided to block 216, which is discussed further below.

At block 216, the continuous parameters are determined. The determination of the domain parameters may include selecting different synthesis results from different domain that may be synthesized with separate methods. Then, a fluid flow simulation is performed in block 218. Similar to the fluid flow simulation of block 110 of FIG. 1, the fluid flow simulation can be performed to match either real or synthetic data, from block 204, or it can be performed without any data to match in a prediction mode. The results of the fluid flow simulation may be provided to block 206 to perform an adjusted to the synthesis. The results of the fluid flow simulation may provide an indication of where in the subsurface model that the parameter may need adjustments to match expected results from data. Following the fluid flow simulation, the results of the fluid flow simulation may be used to produce hydrocarbons, as shown in block 220. The production of hydrocarbons may be similar to the operations described in block 112 of FIG. 1.

Beneficially, the use of the synthesis provides flexibility in computing operations in parallel as opposed to the traditional methods which are sequential in nature. This type of operation leads to computational efficiency and faster decision making with regards to the development of the hydrocarbons. This is especially advantageous in large subsurface regions, which may have millions of cells. Another benefit is that the results are more geologically relevant due to the local coordinates (e.g., local coordinate fields) used as inputs and the replication of geologic patterns in the example based method.

As noted above, procedural synthesis operates by evaluating a procedure on input data. The procedures may include inputting local coordinates in a reservoir model and then using a function of them to produce an output. Procedural synthesis can use any mathematical function that uses local coordinates and noise as inputs.

As an example, equation (e1) is a procedural synthesis involving local coordinates, noise and the sine function. The noise may be correlated or uncorrelated random noise.

$$S=\text{sine}(\text{local coordinates}\pm\text{noise}) \quad (e1)$$

where S represents the final synthesis result (e.g., continuous parameters, such as porosity). Correlated random noise is generated by interpolating sparsely distributed noise with standard interpolating functions, such as cubic spline interpolation.

FIGS. 3, 4, 5 and 6 are utilized to further describe the use of procedural synthesis. Procedural synthesis operates by evaluating a procedure on input data. Examples of typical procedures include inputting local coordinates in a reservoir model and then applying a function to produce an output.

Figure 3:
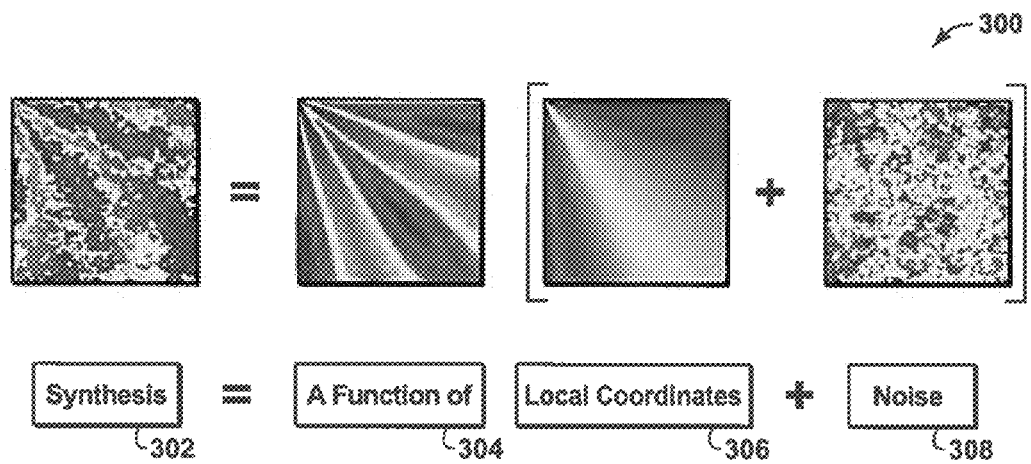
FIG. 3 is a diagram of a procedural synthesis workflow in accordance with an exemplary embodiment of the present techniques.

FIG. 3 is a diagram 300 of a procedural synthesis workflow in accordance with an exemplary embodiment of the present techniques. In this diagram 300, a procedural synthesis 302 is created by applying a function 304 to the combination of a local coordinate field, such as local coordinates 306 (e.g., placed into a framework of the model or may be a vector), and a correlated noise field, such as noise 308. The function 304 may be a trigonometric function, such as sine, for example as noted in equation (e or other suitable functions (e.g., functions may be adjusted based on user preference).

Figure 4:
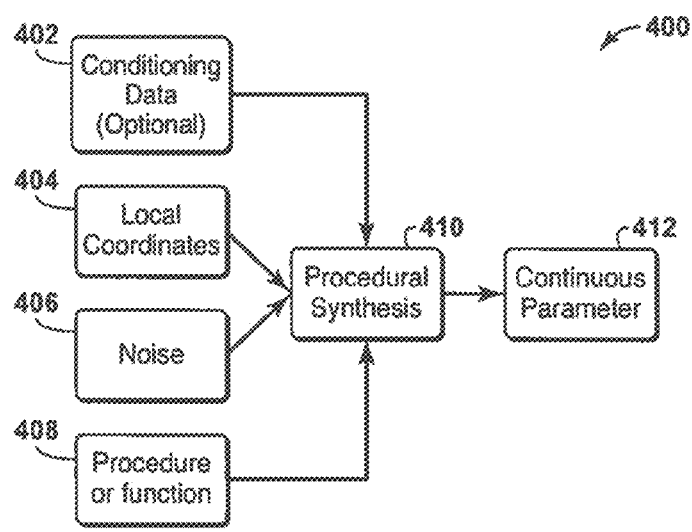
FIG. 4 is a diagram for performing a continuous procedural synthesis in accordance with an exemplary embodiment of the present techniques.

FIG. 4 is a diagram 400 for performing a continuous procedural synthesis in accordance with an exemplary embodiment of the present techniques. In this diagram 400, various data, such as conditioning data 402, local coordinates 404, noise 406 and procedure or function 408, are provided. The data may be stored in memory of a computer system, as an example. The input data is then provided to a procedural synthesis module 410. This module 410 may be configured to calculate or compute the continuous parameters, which are provided to the continuous parameter module 412, by using a specific function, such as function 408 (e.g., equation (e1)). The output of the procedural synthesis module 410 is a continuous parameter module 412. The continuous parameter module 412 may be configured to store the continuous parameters in memory and then provide the continuous parameters for use in further steps of a reservoir modeling workflow.

The distribution of this synthesized output from the procedural synthesis may then be reshaped to match a given target distribution with a transform of the data. The output of procedural synthesis can also be threshold or classified into categorical codes for property modeling, which is described further in FIGS. 5 and 6.

Figure 5:
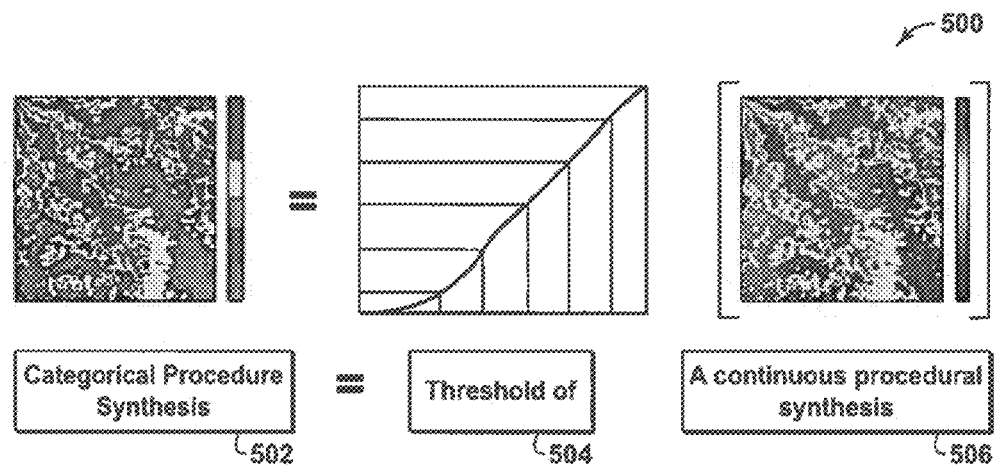
FIG. 5 is a diagram of a categorical procedural synthesis in accordance with an exemplary embodiment of the present techniques.

FIG. 5 is a diagram 500 of a categorical procedural synthesis 502 in accordance with an exemplary embodiment of the present techniques. In this diagram 500, a categorical procedural synthesis 502 is created by applying a threshold 504 to a continuous procedural synthesis 506. The threshold 504 may be determined by analyzing a cumulative distribution function, for example. The threshold 504 may define thresholds based on required percentages to categories.

Figure 6:
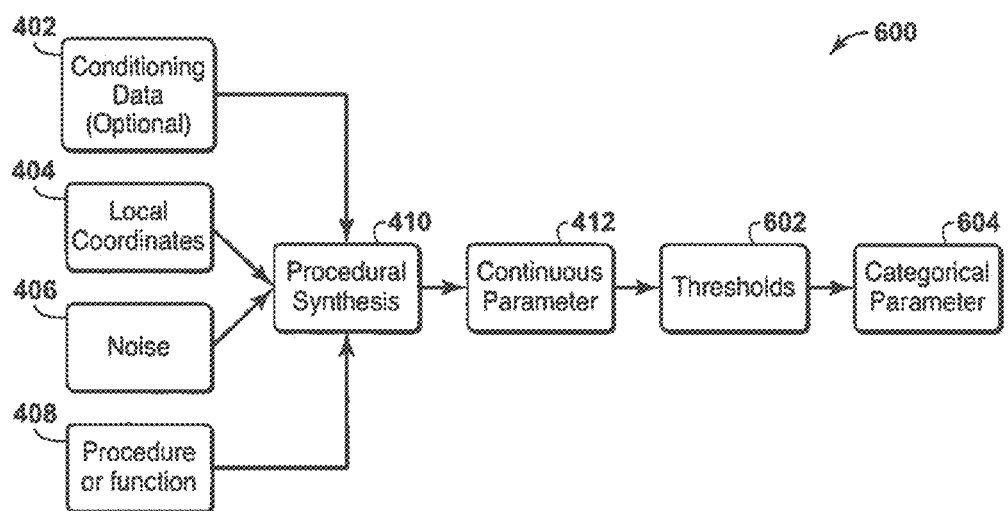
FIG. 6 is another diagram of a categorical procedural synthesis in accordance with an exemplary embodiment of the present techniques.

FIG. 6 is another diagram of a categorical procedural synthesis in accordance with an exemplary embodiment of the present techniques. In this diagram 600, the data, such as conditioning data 402, local coordinates 404, noise 406 and procedure or function 408, and the modules 410 and 412 are similar to the discussion in in FIG. 4. In addition, this diagram includes a thresholds module 602 and a categorical parameter module 604. The continuous parameters output is provided from module 412 to the thresholds module 602. The thresholds module 602 may contain one or more thresholds, which are applied to the continuous parameters in the continuous parameter module 412. The output of the thresholds module 602 may be provided to a categorical parameter module 604 for display or storage of the categorical parameters. The categorical parameter module 604 may be used in further steps of a reservoir modeling workflow.

The other synthesis method that may be used is the example-based synthesis. The example-based synthesis uses additional data as an example for reference in the synthesis process. The example data may include multiple input data types collocated with the corresponding local coordinates. For example, the input data may include: reservoir properties to be modeled; indicators of domains; signed distance functions; vector fields; tensor fields; Jacobian fields; locally computed basis functions; and/or any other relevant feature of the example model.

In the example-based synthesis, the location values of the local coordinates of the example data are synthesized. The synthesis coordinates are then used to locate the values of the new reservoir properties in the example image. FIGS. 7, 8, 9, 10, 11 and 12 are utilized to further describe the use of example-based synthesis.

Geostatistical methods typically visit a location in a predefined grid and simulate a value of a reservoir property. In contrast to the typical geostatistical methods, the example-based synthesis method synthesizes local coordinates of example data and reference the reservoir property to the new location. To synthesize local coordinates of an example data, the method randomly generates values in the corresponding range of the examples local coordinate system. Then, corrections are performed to create a coherent neighborhood. To create a coherent neighborhood, a coherent search strategy is used that searches the example data for a preferred local coordinate based on its neighbors. The preferred local coordinate is determined by collecting the coherent set of potential coordinates, evaluating a metric to rank the coherent set and selecting the coordinate having a preferred evaluated metric, which is either minimized or maximized (this depends on the metric). The objective function may involve minimizing or maximizing the metric, such as L2 norm, least squares approach and/or other suitable approach. The corrections may be performed a number of times (e.g., iteratively, which may be a user defined) until an acceptable image is determined.

Figure 7:
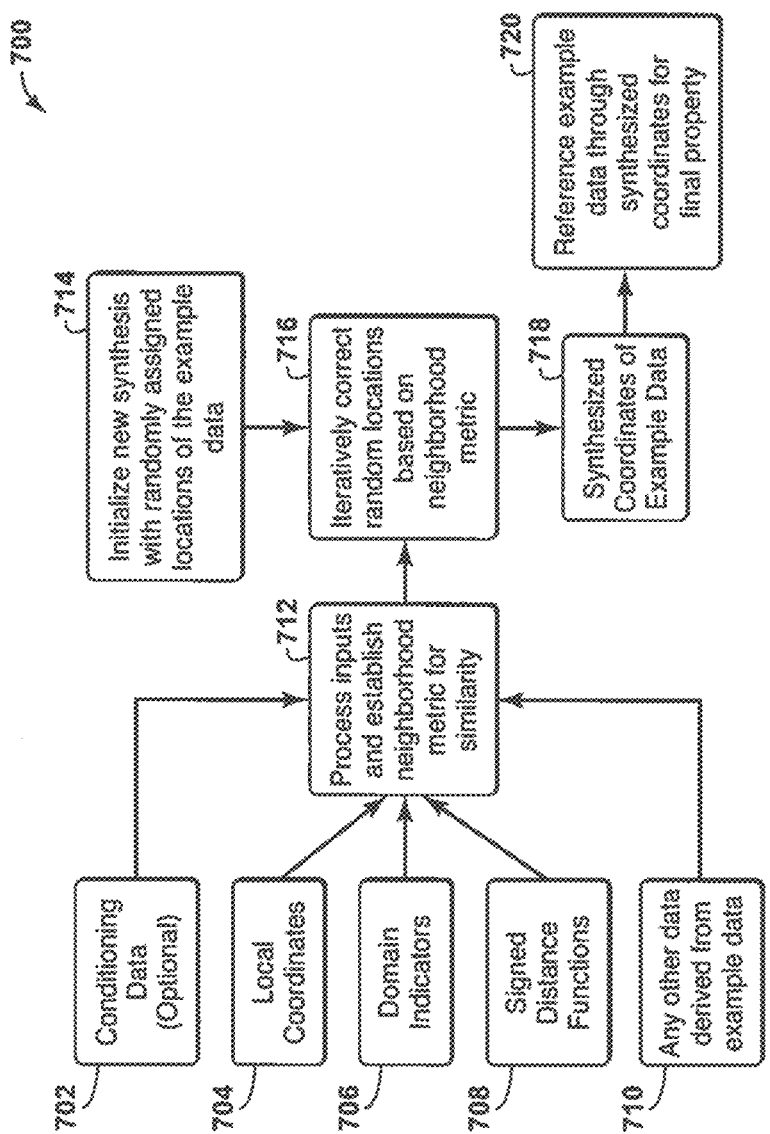
FIG. 7 is a diagram of an example-based synthesis in accordance with an exemplary embodiment of the present techniques.

FIG. 7 is a diagram 700 of an example-based synthesis in accordance with an exemplary embodiment of the present techniques. In this diagram 700, various types of data may be used as input into the process. For example, conditioning data (optional) (e.g., block 702), local coordinates (e.g., block 704), domain indicators (e.g., block 706), signed distance functions (e.g., block 708), and any other data derived from the example data (e.g., block 710) may be provided. Then, the input data is processed and used to establish neighborhood metric for similarity, as shown in block 712. The data may be used in some preprocessing aspects (e.g., creating domain indicators or sign distance functions) and for establishing the neighborhood metric for similarity. For example, the neighborhood metric may include L2 norm between the current data and one or more of the coherent candidates, which may include local coordinates, domain indicators, sign distance functions, and example data. The coherent candidates may be determined through the use of known techniques. See e.g., Tong, X., Zhang, J., Liu, L., Wang, X., Guo, B., and Shum, H. Y.; Synthesis of bidirectional texture functions on arbitrary surfaces. In SIGGRAPH, p. 665-672 (2002). The example data (not shown) may be used to create local coordinates, domain indicators or sign distance functions.

To begin the example based synthesis, a synthesis is initialized with randomly assigned locations (e.g., local coordinates) of the example data to the reservoir model, as shown in block 714. These random locations are the local coordinates of the example data. Then, an iterative correction is performed on those locations based on the neighborhood metric defined by the input data, as shown in block 716. Then, the synthesized coordinates of the example data are obtained, as shown in block 718, and the subsurface parameters (e.g., final property) are referenced through the synthesized coordinates, as shown in block 720. These initial and final results of this process are provided FIGS. 8 and 9 and the iterative results are provided in FIGS. 10, 11 and 12 below. Accordingly, this method of example-based synthesis using the neighborhood correction method.

Figure 8:
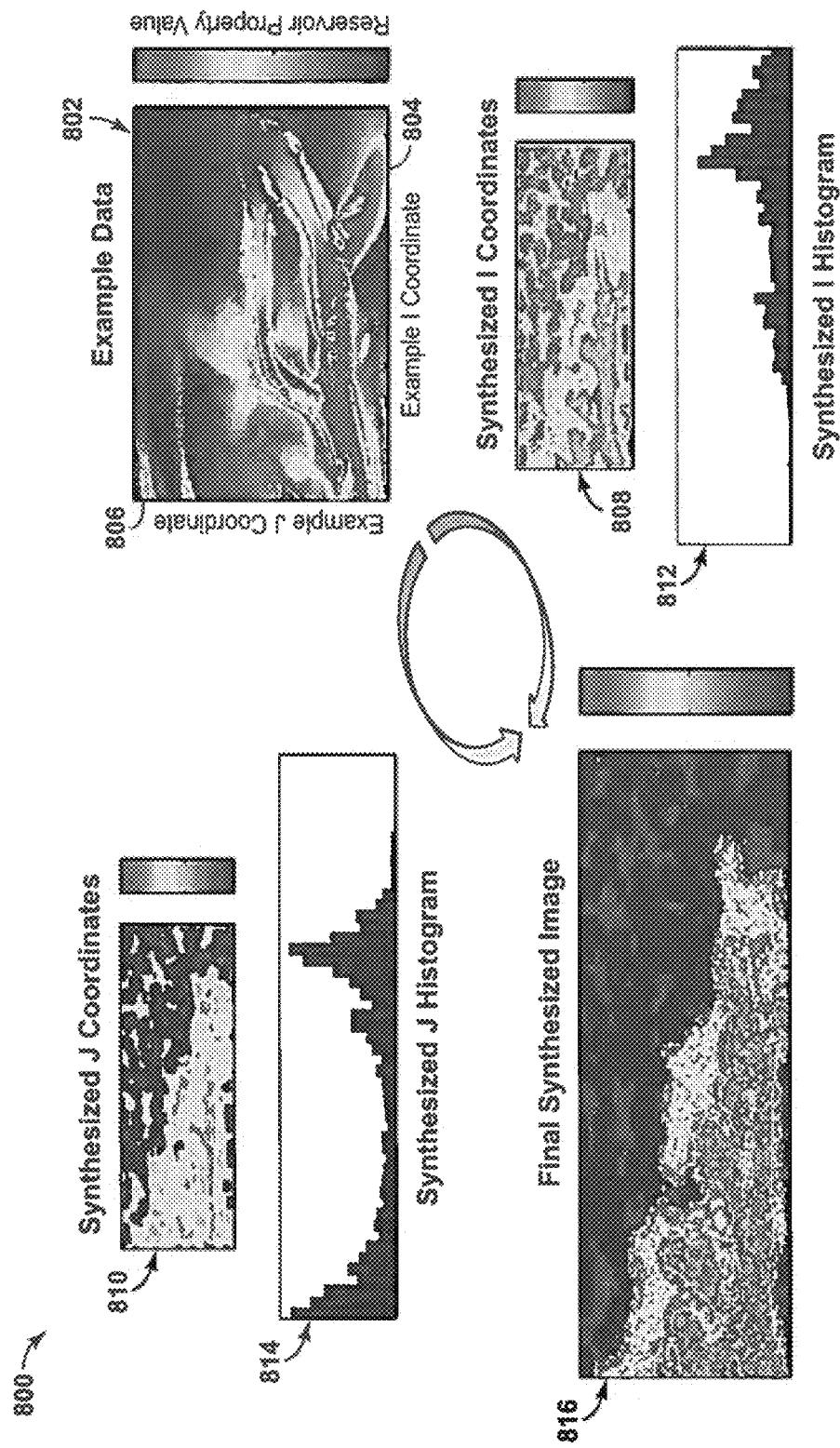
FIG. 8 is a diagram of an example-based synthesis with a continuous data example in accordance with an exemplary embodiment of the present techniques.
Figure 9:
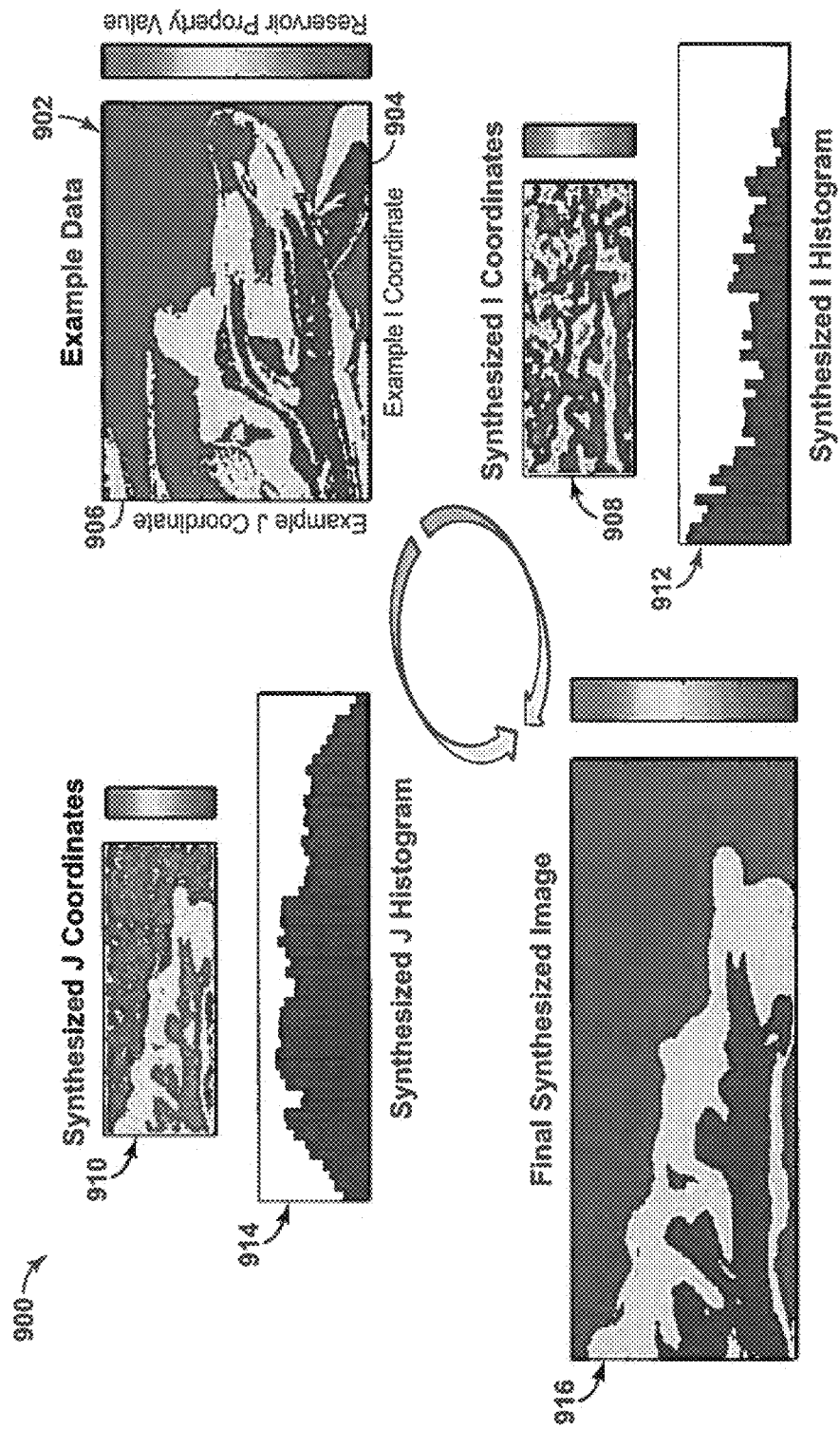
FIG. 9 is a diagram of an example-based synthesis with a categorical data example in accordance with an exemplary embodiment of the present techniques.

Beneficially, the synthesizing local coordinates does not depend on the type of example data. For example, the data may include continuous data, as shown in FIG. 8, or may include categorical data, as shown in FIG. 9. The different example data may change the neighborhood similarity metric (e.g., neighborhood metric), which is built from the input example data FIG. 8 is a diagram 800 of an example-based synthesis with a continuous data example in accordance with an exemplary embodiment of the present techniques. In this diagram 800, an example based continuous parameter synthesis created by synthesizing coordinates of an example image and then referencing their values. This diagram 800 may use the process described in FIG. 7. Histograms of the synthesized coordinates are used to check if the example data is being sampled thoroughly. Each of these diagrams includes various colors from red to blue, which indicate the various intensity values.

In this diagram 800, the example data 802 has example I coordinates 804 and example J coordinates 806. The example I coordinates 804 are the provided in the synthesized I coordinates 808, which are scaled to the same numbers as in the example I coordinates 804. The example J coordinates 806 are the provided in the synthesized coordinates 810, which are scaled to the same numbers as in the example J coordinates 806. The histograms, such as synthesized I histogram 812 associated with the synthesized I coordinates 808 and the synthesized J histogram 814 associated with the synthesized J coordinates 808, illustrate that the example data 802 is broadly sampled. That is, the synthesized coordinates 808 and 810 provide coverage over the example data 802, as shown by the distribution in the synthesized histograms 812 and 814. These histograms are used as verification that the synthesized coordinates 808 and 810 are providing proper coverage from the example data 802. Then, the final synthesized data 816 uses the synthesized coordinates 808 and 810 to index the example data values.

FIG. 9 is a diagram 900 of an example-based synthesis with a categorical data example in accordance with an exemplary embodiment of the present techniques. In this diagram 900, an example based categorical parameter synthesis is created by synthesizing coordinates of an example image and then referencing their values. This diagram 900 may use the process described in FIG. 7. Histograms of the synthesized coordinates are used to check if the example data is being sampled thoroughly. Each of these diagrams includes various colors from red to blue, which indicate the various intensity values.

In this diagram 900, the example data 902 has example I coordinates 904 and example J coordinates 906. The example I coordinates 904 are the provided in the synthesized I coordinates 908, which are scaled to the same numbers as in the example I coordinates 904. The example coordinates 906 are the provided in the synthesized coordinates 910, which are scaled to the same numbers as in the example J coordinates 906. The histograms, such as synthesized I histogram 912 associated with the synthesized I coordinates 908 and the synthesized J histogram 914 associated with the synthesized J coordinates 908, illustrate that the example data 902 is broadly sampled, as shown by the distribution in the synthesized histograms 912 and 914. That is, the synthesized coordinates 908 and 910 provide proper coverage over the example data 902, which may be within a specific threshold. These histograms may be used to verify that the synthesized coordinates 908 and 910 are providing proper coverage from the example data 902. Then, the final synthesized data 916 uses the synthesized coordinates 908 and 910 to index the example data values.

Figure 10:
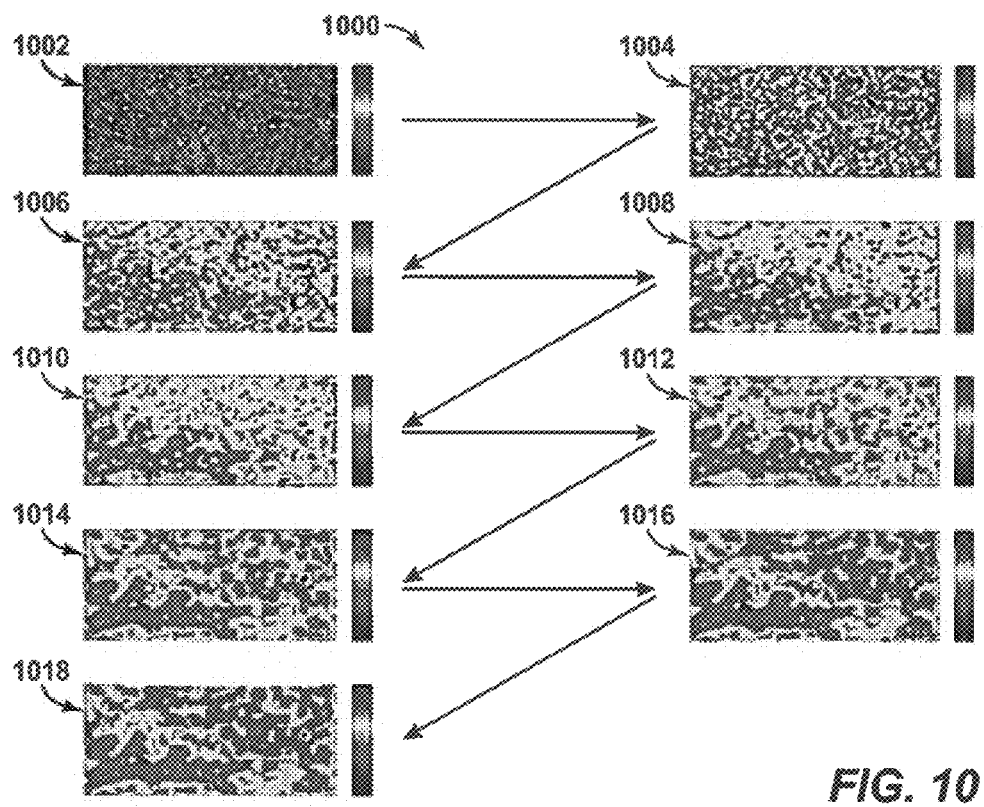
FIG. 10 is a diagram of a synthesized local coordinate I during the neighborhood correction method in accordance with an exemplary embodiment of the present techniques.

FIG. 10 is a diagram 1000 of a synthesized I coordinate during the neighborhood correction method in accordance with an exemplary embodiment of the present techniques. In this diagram 1000, multiple passes or iterates of the neighborhood correction method of FIG. 7 are shown to converge from a random initial state to a final coherent state. Each of these diagrams includes various colors from red to blue, which indicate the various intensity values. For example, the synthesized I coordinates 1002 is an initial random state of the synthesized I coordinates. Each arrow represents one or more iterations of the neighborhood correction method to provide the updated synthesized I coordinates, such as synthesized I coordinates 1004, synthesized I coordinates 1006, synthesized I coordinates 1008, synthesized I coordinates 1010, synthesized I coordinates 1012, synthesized I coordinates 1014, synthesized I coordinates 1016 and synthesized I coordinates 1018. The synthesized I coordinates 1018 being the final synthesized I coordinates, which are the synthesized I coordinates 808 of FIG. 8.

Figure 11:
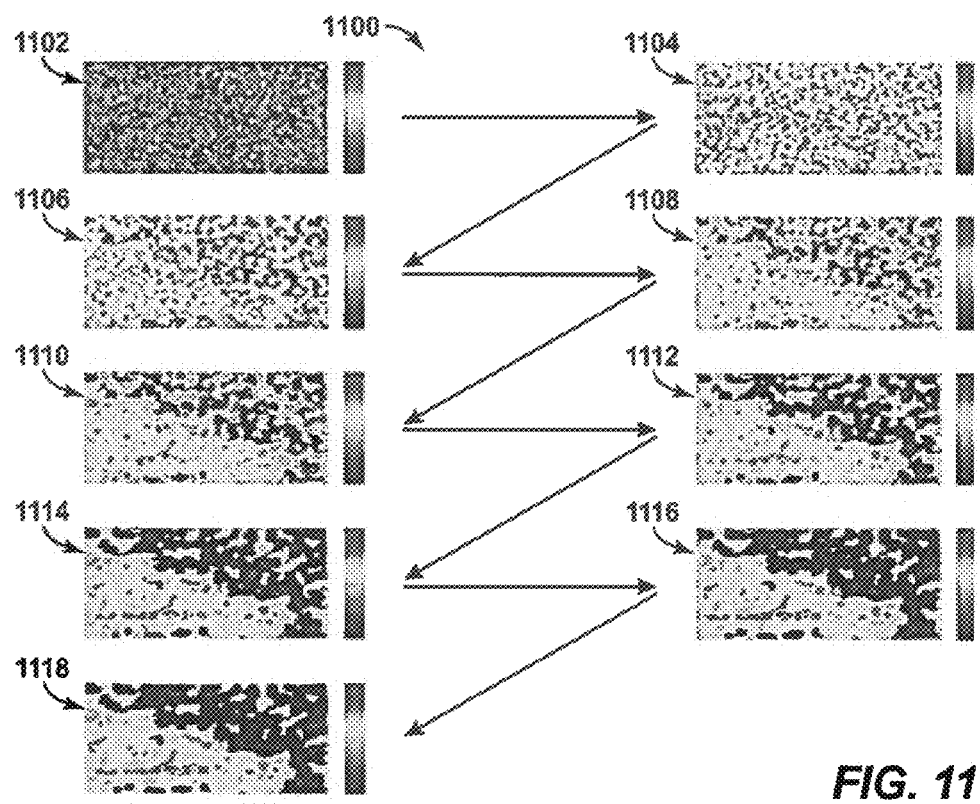
FIG. 11 is a diagram of a synthesized local coordinate J during the neighborhood correction method in accordance with an exemplary embodiment of the present techniques.

FIG. 11 is a diagram 1100 of a synthesized J coordinates during the neighborhood correction method in accordance with an exemplary embodiment of the present techniques. In this diagram 1100, multiple passes of the neighborhood correction method are shown to converge from a random initial state to a final coherent state. Each of these diagrams includes various colors from red to blue, which indicate the various intensity values. For example, the synthesized J coordinates 1102 is an initial random state of the synthesized J coordinates. Each arrow represents one or more iterations of the neighborhood correction method to provide the updated synthesized J coordinates, such as synthesized J coordinates 1104, synthesized J coordinates 1106, synthesized J coordinates 1108, synthesized J coordinates 1110, synthesized J coordinates 1112, synthesized J coordinates 1114, synthesized J coordinates 1116 and synthesized J coordinates 1118. The synthesized J coordinates 1118 being the final synthesized J coordinates, which are the synthesized J coordinates 810 of FIG. 8.

Figure 12:
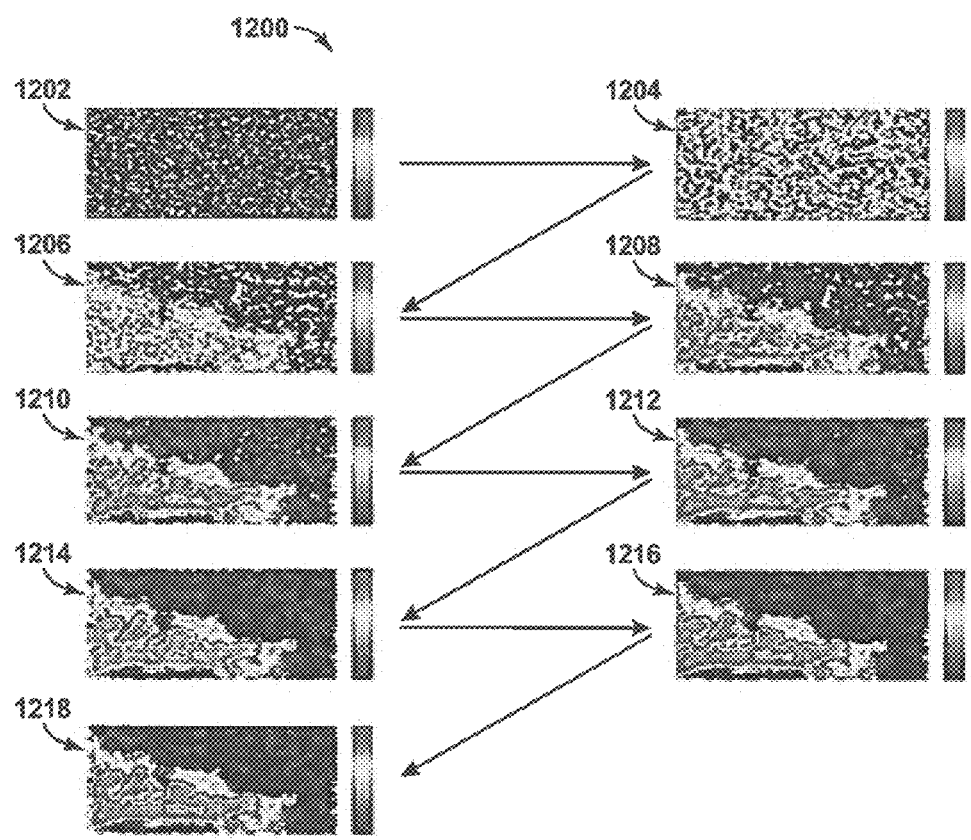
FIG. 12 is a diagram of a synthesized reservoir parameter during the neighborhood correction in accordance with an exemplary embodiment of the present techniques.

FIG. 12 is a diagram 1200 of a synthesized reservoir parameter during the neighborhood correction method in accordance with an exemplary embodiment of the present techniques. In this diagram 1200, at each neighborhood correction pass, the resultant reservoir parameter image is referenced to create a synthesis of the current corrected state. It is shown to converge from a random initial state to a final coherent state. As may be appreciated, each of these images includes various colors from red to blue, which indicate the various intensity values. For example, the synthesized image 1202 is an initial random state of the synthesized image. Each arrow represents one or more iterations of the neighborhood correction method to provide the updated synthesized image, such as synthesized image 1204, synthesized image 1206, synthesized image 1208, synthesized image 1210, synthesized image 1212, synthesized image 1214, synthesized image 1216 and synthesized image 1218. The synthesized image 1218 being the final synthesized image, which is the synthesized image 818 of FIG. 8.

Figure 13:
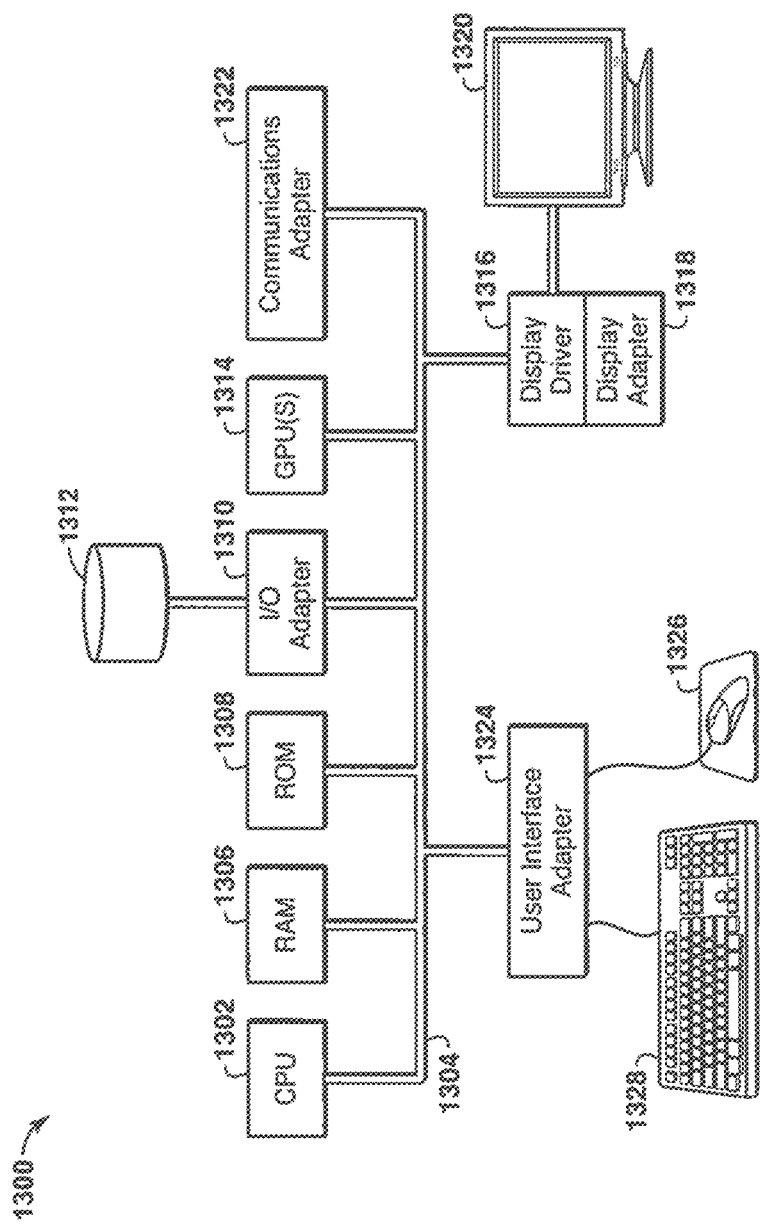
FIG. 13 is a block diagram of a computer system that may be used to perform any of the methods disclosed herein.

As an example, FIG. 13 is a block diagram of a computer system 1300 that may be used to perform any of the methods disclosed herein. A central processing unit (CPU) 1302 is coupled to system bus 1304. The CPU 1302 may be any general-purpose CPU, although other types of architectures of CPU 1302 (or other components of exemplary system 1300) may be used as long as CPU 1302 (and other components of system 1300) supports the inventive operations as described herein. The CPU 1302 may execute the various logical instructions according to disclosed aspects and methodologies. For example, the CPU 1302 may execute machine-level instructions for performing processing according to aspects and methodologies disclosed herein.

The computer system 1300 may also include computer components such as a random access memory (RAM) 1306, which may be SRAM, DRAM, SDRAM, or the like. The computer system 1300 may also include read-only memory (ROM) 1308, which may be PROM, EPROM, EEPROM, or the like. RAM 1306 and ROM 1308 hold user and system data and programs, as is known in the art. The computer system 1300 may also include an input/output (I/O) adapter 1310, a communications adapter 1322, a user interface adapter 1324, and a display adapter 1318. The I/O adapter 1310, the user interface adapter 1324, and/or communications adapter 1322 may, in certain aspects and techniques, enable a user to interact with computer system 1300 to input information.

The I/O adapter 1310 preferably connects a storage device (s) 1312, such as one or more of hard drive, compact disc (CD) drive, floppy disk drive, tape drive, etc. to computer system 1300. The storage device(s) may be used when RAM 1306 is insufficient for the memory requirements associated with storing data for operations of embodiments of the present techniques. The data storage of the computer system 1300 may be used for storing information and/or other data used or generated as disclosed herein. The communications adapter 1322 may couple the computer system 1300 to a network (not shown), which may enable information to be input to and/or output from system 1300 via the network (for example, a wide-area network, a local-area network, a wireless network, any combination of the foregoing). User interface adapter 1324 couples user input devices, such as a keyboard 1328, a pointing device 1326, and the like, to computer system 1300. The display adapter 1318 is driven by the CPU 1302 to control, through a display driver 1316, the display on a display device 1320. Information and/or representations of one or more 2D canvasses and one or more 3D windows may be displayed, according to disclosed aspects and methodologies.

The architecture of system 1300 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method may be implemented in machine-readable logic, set of instructions or code that, when executed, performs a method to determine and/or estimate the seepage locations. The code may be used or executed with a computing system such as computing system 1300. The computer system may be utilized to store the set of instructions that are utilized to manage the data, the different measurement techniques, and other aspects of the present techniques.

For example, the set of instructions may be configured to obtain local coordinates associated with a subsurface region; perform a synthesis with the local coordinates (e.g., a first and second local coordinates or I and J local coordinates); determine one or more of continuous parameters and categorical parameters based on the synthesis; and perform a fluid flow simulation from the continuous parameters or categorical parameters. The set of instructions may further be configured to select to perform a continuous parameter synthesis or combination of categorical and continuous parameter synthesis; to perform a continuous parameter synthesis with the local coordinates as part of the performing synthesis with the local coordinates; and, as part of the performing synthesis with the local coordinates, perform categorical parameter synthesis with the local coordinates; determine a domain parameter; and perform a continuous parameter synthesis with the domain parameter.

In another embodiment, a system for modeling a reservoir using synthesis may include a processor; an input device in communication with the processor and configured to receive input data associated with a subsurface region; memory in communication with the processor, the memory having a set of instructions, wherein the set of instructions, when executed, are configured to: obtain local coordinates associated with the subsurface region; perform a synthesis with the local coordinates; determine one or more of continuous parameters and categorical parameters based on the synthesis; and perform a fluid flow simulation from the one or more of continuous parameters and categorical parameters.

The set of instructions may include variations to the synthesis in certain embodiments. For example, the set of instructions configured to perform a synthesis with the local coordinates may also be configured to select to perform one of a continuous parameter synthesis and a combination of categorical parameter synthesis and a continuous parameter synthesis. Also, the set of instructions may be configured to determine an indication of parameter adjustments based on a comparison to example data associated with the subsurface region in the fluid flow simulation.

The set of instructions may also be configured to perform a continuous parameter synthesis by a procedural synthesis. For example, the set of instructions may be configured to compute a function of the local coordinates and noise, wherein the function is S=sine(local coordinates+noise); and where S represents the continuous parameters. Further, the set of instructions may be configured to generate noise by interpolating sparsely distributed noise with a cubic spline interpolation.

Moreover, the set of instructions may be configured to perform a continuous parameter synthesis by an example based synthesis. For example, the set of instructions may be configured to perform the continuous parameter synthesis by the example based synthesis are configured to: obtain example data; synthesize location values of the local coordinates from the example data; and locate reservoir properties in a reservoir model based on the synthesized location values of the local coordinates. Also, the set of instructions may be configured to perform the continuous parameter synthesis by the example based synthesis are configured to: obtain example data; randomly assign locations of the example data; perform an iterative correction of the assigned locations based on the neighborhood metric; and synthesizing coordinates of the example data. The set of instructions may also be configured to determine the neighborhood metric based on local coordinates, domain indicators, sign distance functions, example data and other data derived from the example data; and may be configured to determine one or more of continuous parameters and categorical parameters based on the synthesis and may be configured to reference the one or more of continuous parameters and categorical parameters based on the synthesized coordinates. The example data may include one or more of reservoir properties to be modeled; indicators of domains; signed distance functions; vector fields; tensor fields; Jacobian fields; and locally computed basis functions.

Further still, the set of instructions may be configured to create a categorical procedural synthesis by applying a threshold to a continuous procedural synthesis. Also, the set of instructions configured to perform the synthesis with the local coordinates may be configured to: perform categorical parameter synthesis with the local coordinates; determine a domain parameter; and perform a continuous parameter synthesis with the domain parameter.

Further, in one or more embodiments, the computer system 1300 may include one or more processors, one or more co-processors and/or one or more graphical processing units (GPU) that are configured to perform the computations. The processor, co-processor and/or GPU may be configured to distribute the computations and/or data for performing the calculations.

One or more embodiments may include the following:
1. A method for exploring and extracting hydrocarbons comprising: obtaining local coordinates associated with a subsurface region; performing a synthesis with the local coordinates; determining one or more of continuous parameters and categorical parameters based on the synthesis; and performing a fluid flow simulation from the one or more of continuous parameters and categorical parameters.
2. The method of paragraph 1, wherein performing the synthesis with the local coordinates further comprises selecting to perform one of a continuous parameter synthesis and a combination of categorical parameter synthesis and a continuous parameter synthesis.
3. The method of paragraph 1, wherein the fluid flow simulation provides an indication of parameter adjustments based on a comparison to example data associated with the subsurface region.
4. The method of any one of paragraphs 1 to 3, wherein performing the synthesis with the local coordinates further comprises performing a continuous parameter synthesis by a procedural synthesis.
5. The method of paragraph 4, wherein performing the synthesis with the local coordinates further comprises: computing a function of the local coordinates and noise.
6. The method of paragraph 5, wherein the function is: S=sine(local coordinates+noise); and where S represents the continuous parameters.
7. The method of any one of paragraphs 5 and 6, wherein the noise is generated by interpolating sparsely distributed noise with a cubic spline interpolation.
8. The method of any one of paragraphs 1 to 3, wherein performing the synthesis with the local coordinates further comprises performing a continuous parameter synthesis by an example based synthesis.
9. The method of paragraph 8, wherein performing the continuous parameter synthesis by the example based synthesis comprises: obtaining example data; synthesizing location values of the local coordinates of the example data; and locating reservoir properties in a reservoir model based on the synthesizing location values of the local coordinates.
10. The method of paragraph 8, wherein performing the continuous parameter synthesis by the example based synthesis comprises: obtaining example data; randomly assigning locations of the example data; performing an iterative correction of the assigned locations based on the neighborhood metric; and synthesizing coordinates of the example data.
11. The method of paragraph 10, wherein the neighborhood metric is determined based on local coordinates, domain indicators, sign distance functions, the example data and other data derived from the example data.

12. The method of any one of paragraphs 9 to 11, wherein determining one or more of continuous parameters and categorical parameters based on the synthesis further comprises: using the synthesized coordinates to reference the one or more of continuous parameters and categorical parameters.

13. The method of paragraph 9, wherein example data comprises one or more of reservoir properties to be modeled; indicators of domains; signed distance functions; vector fields; tensor fields; Jacobian fields; and locally computed basis functions.

14. The method of any one of paragraphs 1 to 3, wherein performing the synthesis with the local coordinates comprises creating a categorical procedural synthesis by applying a threshold to a continuous procedural synthesis.

15. The method of paragraph 1, wherein performing the synthesis with the local coordinates further comprises: performing categorical parameter synthesis with the local coordinates; determining a domain parameter; and performing a continuous parameter synthesis with the domain parameter.

16. The method of any one of paragraphs 1 to 15, further comprising producing hydrocarbons based on the fluid flow simulation.

17. A system for modeling a reservoir using synthesis, comprising: a processor; an input device in communication with the processor and configured to receive input data associated with a subsurface region; memory in communication with the processor, the memory having a set of instructions, wherein the set of instructions, when executed, are configured to: obtain local coordinates associated with the subsurface region; perform a synthesis with the local coordinates; determine one or more of continuous parameters and categorical parameters based on the synthesis; and perform a fluid flow simulation from the one or more of continuous parameters and categorical parameters.

18. The system of paragraph 17, wherein the set of instructions configured to perform the synthesis with the local coordinates are further configured to select to perform one of a continuous parameter synthesis and a combination of categorical parameter synthesis and a continuous parameter synthesis.

19. The system of paragraph 17, wherein the set of instructions are further configured to determine an indication of parameter adjustments based on a comparison to example data associated with the subsurface region in the fluid flow simulation.

20. The system of any one of paragraphs 17 to 19, wherein the set of instructions configured to perform the synthesis with local coordinates are further configured to perform a continuous parameter synthesis by a procedural synthesis.

21. The system of paragraph 20, wherein the set of instructions configured to perform the continuous parameter synthesis by the procedural synthesis are further configured to compute a function of the local coordinates and noise.

22. The system of paragraph 21, wherein the function is: S=sine(local coordinates+noise); and where S represents the continuous parameters.

23. The system of any one of paragraphs 21 and 22, wherein the set of instructions are further configured to generate noise by interpolating sparsely distributed noise with a cubic spline interpolation.

24. The system of any one of paragraphs 17 to 19, wherein the set of instructions configured to perform the synthesis with local coordinates are further configured to perform a continuous parameter synthesis by an example based synthesis.

25. The system of paragraph 24, wherein the set of instructions configured to perform the continuous parameter synthesis by the example based synthesis are configured to: obtain example data; synthesize location values of the local coordinates from the example data; and locate reservoir properties in a reservoir model based on the synthesized location values of the local coordinates.

26. The system of paragraph 24, wherein the set of instructions configured to perform the continuous parameter synthesis by the example based synthesis are configured to: obtain example data; randomly assign locations of the example data; perform an iterative correction of the assigned locations based on the neighborhood metric; and synthesizing coordinates of the example data.

27. The system of paragraph 26, wherein the set of instructions configured to determine the neighborhood metric based on local coordinates, domain indicators, sign distance functions, example data and other data derived from the example data.

28. The system of any one of paragraphs 25 to 27, wherein the set of instructions configured to determining one or more of continuous parameters and categorical parameters based on the synthesis further are further configured to reference the one or more of continuous parameters and categorical parameters based on the synthesized coordinates.

29. The system of paragraph 25, wherein example data comprises one or more of reservoir properties to be modeled; indicators of domains; signed distance functions; vector fields; tensor fields; Jacobian fields; and locally computed basis functions.

30. The system of any one of paragraphs 17 to 19, wherein the set of instructions configured to perform the synthesis with the local coordinates are further configured to create a categorical procedural synthesis by applying a threshold to a continuous procedural synthesis.

31. The system of paragraph 17, wherein the set of instructions configured to perform the synthesis with the local coordinates are further configured to: perform a categorical parameter synthesis with the local coordinates; determine a domain parameter; and perform a continuous parameter synthesis with the domain parameter.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for simulating fluid flow within a subsurface region comprising:
    obtaining local coordinates associated with the subsurface region;

performing a synthesis with the local coordinates, wherein the synthesis comprises one or more of:
(a) a continuous parameter synthesis that comprises a procedural synthesis or an example-based synthesis, or
(b) a combination of categorical parameter synthesis and continuous parameter synthesis, wherein the continuous parameter synthesis comprises a procedural synthesis or an example-based synthesis;
determining one or more properties of the subsurface region from the one or more of continuous parameters and categorical parameters based on the synthesis; and
performing a simulation of fluid flow within the subsurface region using the one or more properties.

2. The method of claim 1, wherein the fluid flow simulation provides an indication of parameter adjustments based on a comparison to example data associated with the subsurface region.

3. The method of claim 1, wherein performing the synthesis with the local coordinates further comprises performing a continuous parameter synthesis by a procedural synthesis.

4. The method of claim 3, wherein performing the synthesis with the local coordinates further comprises: computing a function of the local coordinates and noise.

5. The method of claim 4, wherein the function is:

$S=\text{sine}(\text{local coordinates}+\text{noise})$; and where S represents the continuous parameters.

6. The method of claim 4, wherein the noise is generated by interpolating sparsely distributed noise with a cubic spline interpolation.

7. The method of claim 1, wherein performing the synthesis with the local coordinates further comprises performing a continuous parameter synthesis by an example based synthesis.

8. The method of claim 7, wherein performing the continuous parameter synthesis by the example based synthesis comprises:
obtaining example data;
synthesizing location values of the local coordinates of the example data; and
locating reservoir properties in a reservoir model based on the synthesizing location values of the local coordinates.

9. The method of claim 7, wherein performing the continuous parameter synthesis by the example based synthesis comprises:
obtaining example data;
randomly assigning locations of the example data;
performing an iterative correction of the assigned locations based on the neighborhood metric; and
synthesizing coordinates of the example data.

10. The method of claim 9, wherein the neighborhood metric is determined based on local coordinates, domain indicators, sign distance functions, the example data and other data derived from the example data.

11. The method of claim 8, wherein determining one or more of continuous parameters and categorical parameters based on the synthesis further comprises: using the synthesized coordinates to reference the one or more of continuous parameters and categorical parameters.

12. The method of claim 8, wherein example data comprises one or more of reservoir properties to be modeled; indicators of domains; signed distance functions; vector fields; tensor fields; Jacobian fields; and locally computed basis functions.

13. The method of claim 1, wherein performing the synthesis with the local coordinates comprises creating a categorical procedural synthesis by applying a threshold to a continuous procedural synthesis.

14. The method of claim 1, wherein performing the synthesis with the local coordinates further comprises:
performing categorical parameter synthesis with the local coordinates;
determining a domain parameter; and
performing a continuous parameter synthesis with the domain parameter.

15. The method of claim 1, further comprising producing hydrocarbons based on the fluid flow simulation.

16. A system for simulating fluid flow within a subsurface region using synthesis, comprising:
a processor;
an input device in communication with the processor and configured to receive input data associated with the subsurface region;
memory in communication with the processor, the memory having a set of instructions, wherein the set of instructions, when executed, are configured to:
obtain local coordinates associated with the subsurface region;
perform a synthesis with the local coordinates, wherein the synthesis comprises one or more of:
(a) a continuous parameter synthesis that comprises a procedural synthesis or an example-based synthesis, or
(b) a combination of categorical parameter synthesis and continuous parameter synthesis, wherein the continuous parameter synthesis comprises a procedural synthesis or an example-based synthesis;
determine one or more properties of the subsurface region from the one or more of continuous parameters and categorical parameters based on the synthesis; and
perform a simulation of fluid flow within the subsurface region using the one or more properties.

17. The system of claim 16, wherein the set of instructions are further configured to determine an indication of parameter adjustments based on a comparison to example data associated with the subsurface region in the fluid flow simulation.

18. The system of claim 16, wherein the set of instructions configured to perform the synthesis with local coordinates are further configured to perform a continuous parameter synthesis by a procedural synthesis.

19. The system of claim 18, wherein the set of instructions configured to perform the continuous parameter synthesis by the procedural synthesis are further configured to compute a function of the local coordinates and noise.

20. The system of claim 19, wherein the function is:

$S=\text{sine}(\text{local coordinates}+\text{noise})$; and where S represents the continuous parameters.

21. The system of claim 19, wherein the set of instructions are further configured to generate noise by interpolating sparsely distributed noise with a cubic spline interpolation.

22. The system of claim 16, wherein the set of instructions configured to perform the synthesis with local coordinates are further configured to perform a continuous parameter synthesis by an example based synthesis.

23. The system of claim 22, wherein the set of instructions configured to perform the continuous parameter synthesis by the example based synthesis are configured to:
obtain example data;

synthesize location values of the local coordinates from the example data; and locate reservoir properties in a reservoir model based on the synthesized location values of the local coordinates.

24. The system of claim 22, wherein the set of instructions configured to perform the continuous parameter synthesis by the example based synthesis are configured to:

obtain example data;

randomly assign locations of the example data;

perform an iterative correction of the assigned locations based on the neighborhood metric; and synthesizing coordinates of the example data.

25. The system of claim 24, wherein the set of instructions configured to determine the neighborhood metric based on local coordinates, domain indicators, sign distance functions, example data and other data derived from the example data.

26. The system of claim 23, wherein the set of instructions configured to determining one or more of continuous parameters and categorical parameters based on the synthesis further are further configured to reference the one or more of continuous parameters and categorical parameters based on the synthesized coordinates.

27. The system of claim 23, wherein example data comprises one or more of reservoir properties to be modeled; indicators of domains; signed distance functions; vector fields; tensor fields; Jacobian fields; and locally computed basis functions.

28. The system of claim 16, wherein the set of instructions configured to perform the synthesis with the local coordinates are further configured to create a categorical procedural synthesis by applying a threshold to a continuous procedural synthesis.

29. The system of claim 16, wherein the set of instructions configured to perform the synthesis with the local coordinates are further configured to:

perform a categorical parameter synthesis with the local coordinates;

determine a domain parameter; and perform a continuous parameter synthesis with the domain parameter.

* * * * *